United States Patent
Paillet et al.

(10) Patent No.: US 7,278,251 B2
(45) Date of Patent: Oct. 9, 2007

(54) WRAPPING MATERIAL INDICATOR ARRANGEMENT

(75) Inventors: Frédéric Paillet, Gray (FR); Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 105 days.

(21) Appl. No.: 11/314,547

(22) Filed: Dec. 21, 2005

(65) Prior Publication Data

US 2006/0150582 A1    Jul. 13, 2006

(30) Foreign Application Priority Data

Jan. 12, 2005    (DE) .................. 10 2005 001 406

(51) Int. Cl.
*B65B 11/04*    (2006.01)
*B65B 57/18*    (2006.01)

(52) U.S. Cl. .......... 53/508; 53/389.4; 53/587; 242/563.2; 242/912

(58) Field of Classification Search ............. 53/389.4, 53/508; 242/563.2, 912
See application file for complete search history.

(56) References Cited

U.S. PATENT DOCUMENTS

| | | | | | |
|---|---|---|---|---|---|
| 1,992,394 | A | * | 2/1935 | Roe ........................ | 312/34.8 |
| 2,601,956 | A | * | 7/1952 | Birr ........................ | 242/564.1 |
| 3,627,227 | A | * | 12/1971 | Foor ........................ | 242/343.2 |
| 5,109,652 | A | * | 5/1992 | Viaud et al. .................. | 53/508 |
| 5,152,123 | A | * | 10/1992 | Viaud et al. .................. | 53/508 |
| 5,537,798 | A | * | 7/1996 | Fukuda et al. ................. | 53/55 |
| 5,551,218 | A | * | 9/1996 | Henderson et al. ........... | 53/504 |
| 6,854,684 | B2 | * | 2/2005 | Byrd et al. ................. | 242/563 |
| 6,966,162 | B2 | * | 11/2005 | Viaud et al. .................. | 53/64 |
| 7,156,340 | B2 | * | 1/2007 | Shiraishi et al. ......... | 242/555.5 |

OTHER PUBLICATIONS

New Holland Q-Netz Brochure, Nov. 12, 2001, 2 Pages.

* cited by examiner

*Primary Examiner*—John Sipos

(57) ABSTRACT

A wrapping material indicator arrangement for a wrapping machine, in particular a rotobaler. The indicator is supported on the circumference of a wrapping material roll, from which wrapping material is withdrawn during a wrapping operation. A rotating counter roll, pressed against the wrapping material roll, drives a rotating wheel mounted on an arm that allows the wheel to translate through an arc. The translation of the wheel and arm indicates the amount of wrapping material left on the wrapping material roll and its rotation allows an operator to monitor the operation of the rotobaler for malfunctions during the wrapping operation.

9 Claims, 5 Drawing Sheets

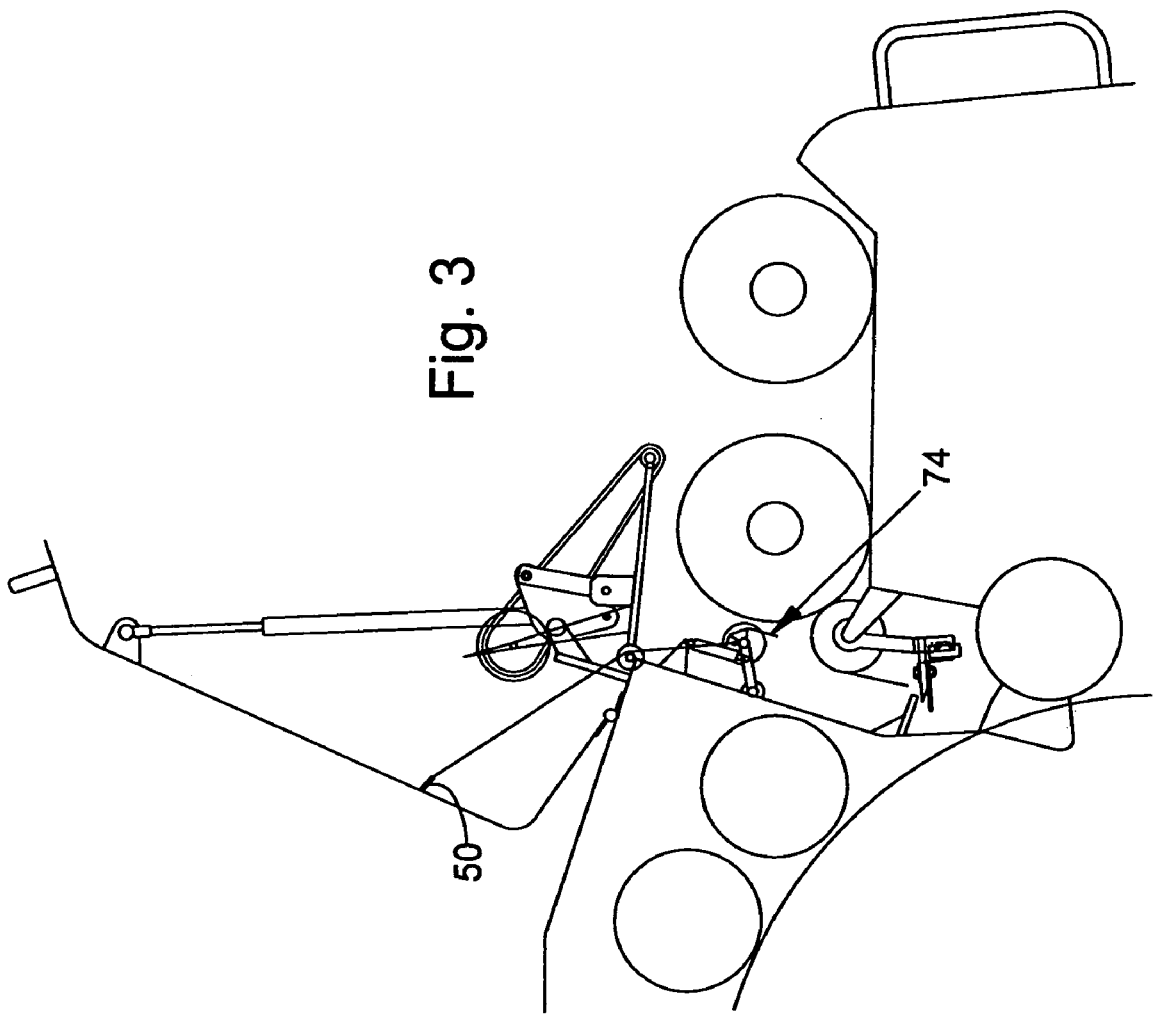

WRAPPING MATERIAL INDICATOR ARRANGEMENT

BACKGROUND

1. Field of the Invention

The present invention concerns a wrapping material indicator used to monitor whether wrapping material is being disbursed from a roll, and how much remains on the roll in various industrial applications, in particular in agricultural applications and specifically on rotobalers.

2. Description of the Related Art

Existing wrapping material rolls incorporate a red warning stripe that points toward either end of the roll. The wrapping material must be directly observed from the towing vehicle to allow an operator to establish whether material still remains on the roll, and whether it is being withdrawn during the wrapping operation. This type of monitoring requires the wrapping material to be directly visible to the operator, meaning the material roll is open and exposed to contamination by harvested crops, dirt, and other foreign objects. Moreover, when wrapping material has a homogeneous surface, such as netting, foil, paper and the like, it may be difficult for an operator to recognize the motion of the material.

In view of the above, it is apparent that there exists a need for a wrapping material indicator, other than simply viewing the wrapping material itself, that prevents the intrusion of crops, dirt, or other debris and that allows the operator to reliably monitor the operational status of the material roll.

BRIEF SUMMARY

In satisfying the above need, as well as overcoming the enumerated drawbacks and other limitations of the related art, the present invention provides a wrapping material indicator located within the visual range of the operator. This allows the wrapping material itself to be provided at a different location. The indicator may include a wheel brought into rotation directly or indirectly by a rotating wrapping material roll. As a result, not only the amount but also the motion of the wrapping material can be detected. This arrangement also means the changing diameter of the material roll has no effect on the speed of rotation of the wheel.

To accurately reflect the motion, and the amount of wrapping material, a secure contact between the wrapping material indicator wheel and the wrapping material roll is required. This is achieved by including a counter roll brought into contact with the wrapping material roll. The wheel is then driven by means of a tensioning device, such as a belt or a chain, connected to the counter roll. Using this means, the wheel can be located in a different area than the wrapping material roll. The counter roll may be a body of revolution that extends over the entire width of the wrapping material, or it may be a shaft with wheels, that rolls upon the circumference. The counter roll may be formed of plastic, metal or other appropriate material.

This arrangement allows the wrapping material roll's movement and diameter to be monitored on the indicator while the roll is protected against exposure from harvested crops, rain, dirt and debris. To accomplish this at least one arm is provided having a bar mounted thereon which projects through a recess in a cover over the wrapping material roll. One end of the arm is supported on bearings in a stationary location, free to pivot, and its free end is supported on the wrapping material roll. This arrangement allows information regarding the amount of wrapping material on the roll to be determined on the basis of the changing position of the arm, and the wheel fastened to the arm, relative to the recess. A scale on the cover corresponds to the amount of material on the roll as the bar moves through the recess. Alternatively, the arm can be configured to send an electrical signal to a display or gage.

To assure that the wrapping material roll is held in its operating position, the arm and, if necessary, the counter roll is forced against the roll. The actuation arrangement used for this purpose may be a gas spring, a mechanical spring, or a linear motor actuated hydraulically, pneumatically, electrically or the like.

The motion of the wrapping material and the amount of wrapping material can be determined visually (i.e. with markings), or electrically. In the latter case a signal is generated corresponding to the position and rotational speed of the wheel using, for example, a potentiometer, generator, or similar device.

In rotobalers, in which this invention is predominately used, the wrapping material is usually pulled off the roll by a rotating crop bale. However, malfunctions may occur if the wrapping material is grasped by a roller or another element, of the machine. This causes the roller, rather than the bale, to pull material off the roll. As such, since a roller will withdraw the material at a different rate than the bale, it is beneficial to monitor the velocity of the wrapping material roll and compare the rotational speed of the wrapping material roll to an ideal velocity. If a significant difference is detected a warning signal may be generated, alerting the operator to any malfunctions.

Finally, the wrapping material indicator arrangement may extend through any recess in the frame, sheathing, or similar structure. To ensure easy accessibility in case of a malfunction, the recess may be provided in or on a cover that encloses the wrapping arrangement. The recess may be provided with seals or be located in a position where no dirt, harvested crop or debris can intrude.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 3 illustrates the wrapping material supply seen in FIG. 2 in a non-operating position;

DETAILED DESCRIPTION

Figure 1:
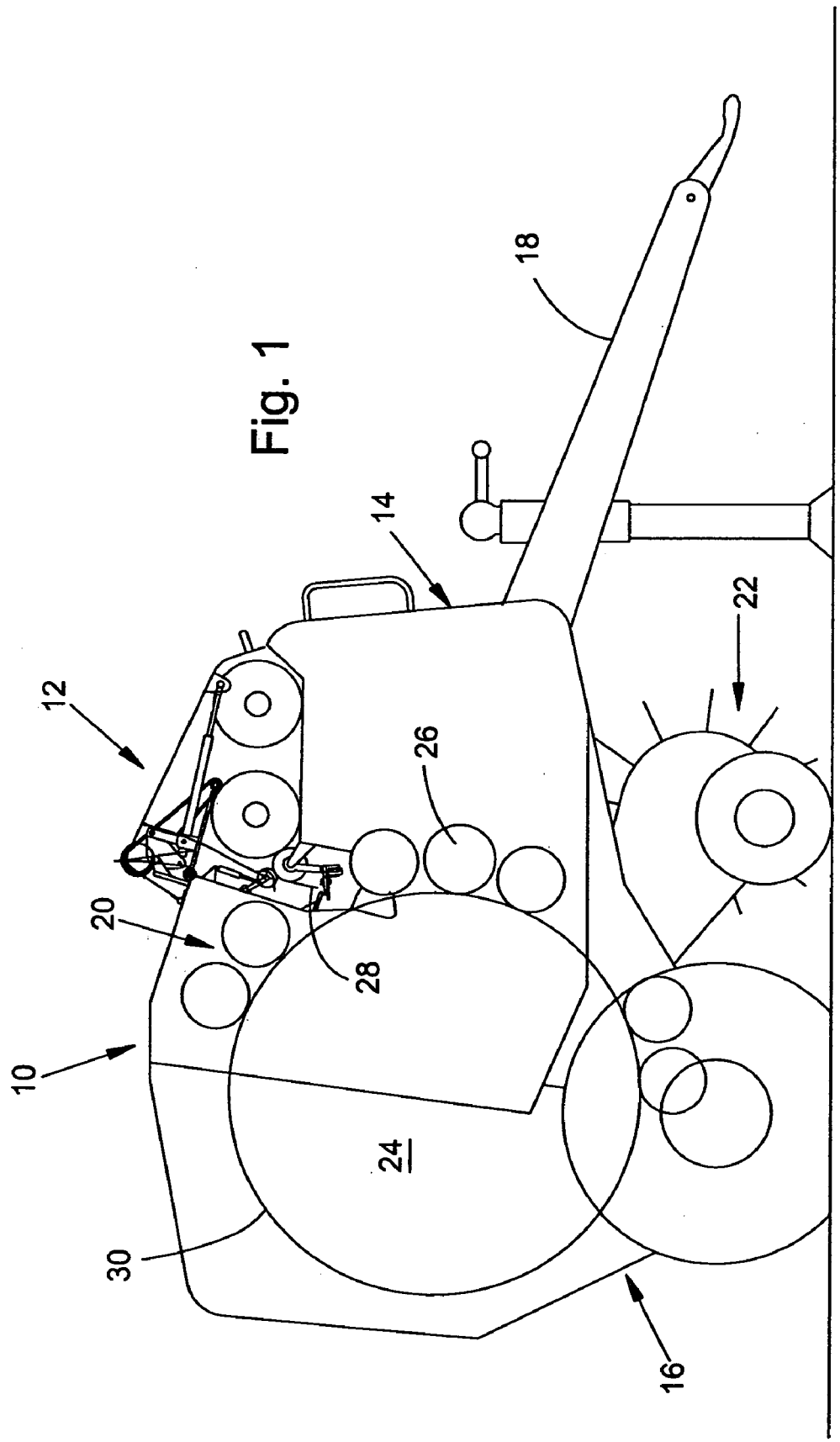
FIG. 1 illustrates a side view of a rotobaler.

Referring now to the drawings, a rotobaler embodying the principles of the present invention is illustrated in FIG. 1 and designated at 10. In this case the rotobaler 10 is configured for agriculture, but it can also be used for industrial applications, garbage removal, forestry or the like. As its primary components, the rotobaler 10 includes a frame 14, running gear (such as wheels) 16, a towbar 18, a baling arrangement 20, a pick-up arrangement 22 and a wrapping arrangement 12. The frame 14 is configured in a known manner as a welded and bolted assembly supported by the running gear 16 and coupled to a towing vehicle (not shown), by means of the towbar 18, except when the rotobaler 10 is a stationary unit.

The bailing arrangement 20 surrounds a baling chamber 24. The baling chamber 24 is enclosed by walls at its ends and is used to accept and compress a harvested crop conducted to it by the pick-up arrangement 22. The pick-up arrangement 22 is configured to be followed, if necessary, by a cutting arrangement or other crop processing equipment that takes up harvested crop from the ground and feeds it into the baling chamber 24. In the embodiment shown, the circumference of the baling chamber 24 is surrounded by baling elements 26 arranged in a circular arc and configured as is known in the art. At approximately the 2 o'clock position, a space is formed between two baling elements 26, through which a wrapping material 28 may be introduced.

The frame 14 is provided with a rear flap (not shown), that can be raised so that a cylindrical bale 30, formed in the baling chamber 24, can roll out. At least some of the baling elements 26 are driven in such a way that the bale 30 rotates in the clockwise direction when viewed as in FIG. 1. However, it is also possible for the bale to rotate counterclockwise.

Figure 2:
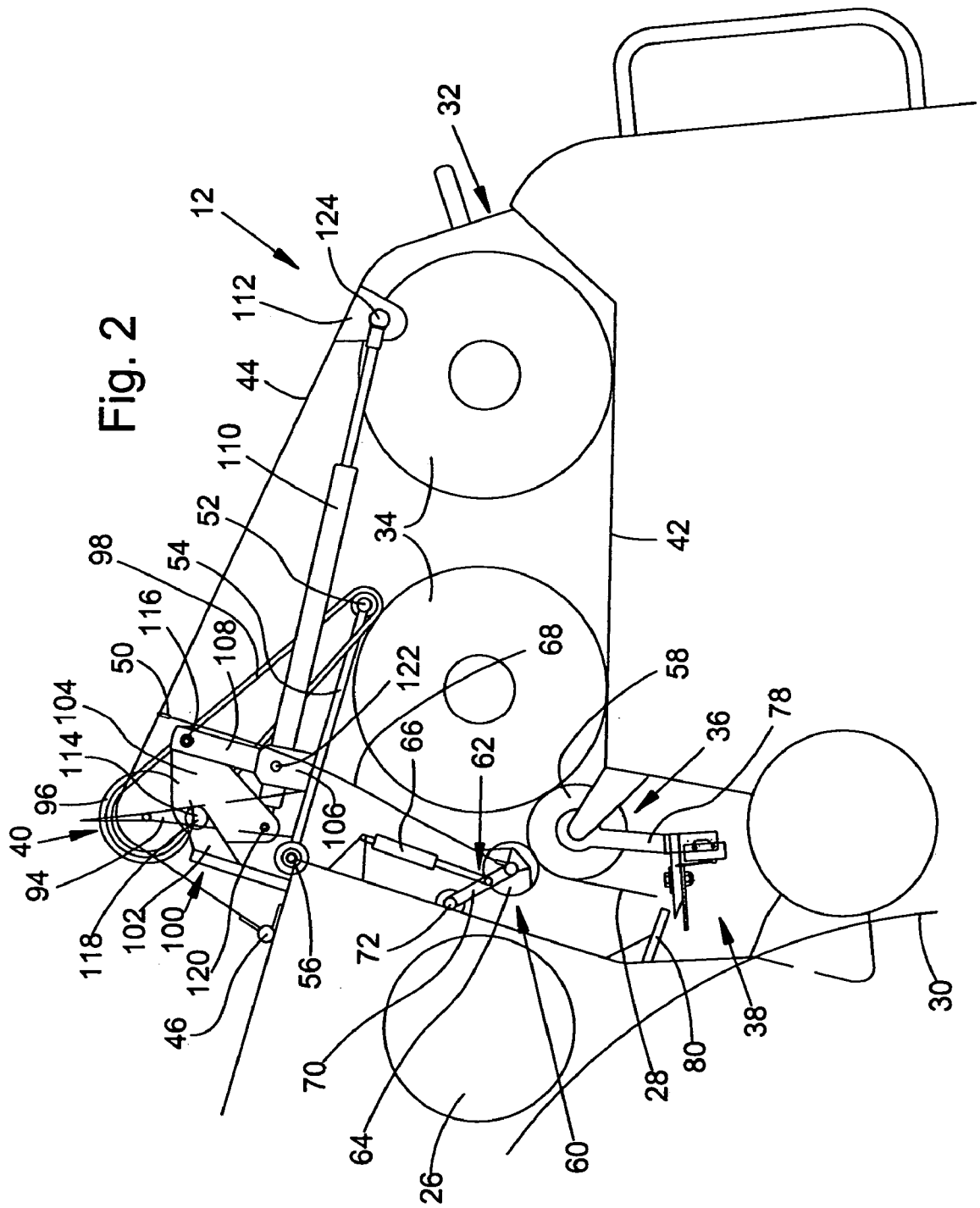
FIG. 2 is an enlarged side view of a wrapping arrangement of the rotobaler seen in FIG. 1 with a wrapping material supply in an operating position.

In the present embodiment, the wrapping arrangement 12 is located in the forward upper region of the rotobaler 10, but could also be provided in the rear upper region, or in a center region. As shown in FIG. 2, a housing 32, at least one wrapping material roll 34, a wrapping material supply arrangement 36, a wrapping material separating arrangement 38 and a wrapping material indicator arrangement 40 are provided with the wrapping arrangement 12. The wrapping arrangement 12 need not be applied only to a rotobaler, but can be used in any application where a body is wrapped with wrapping material.

Figure 7:
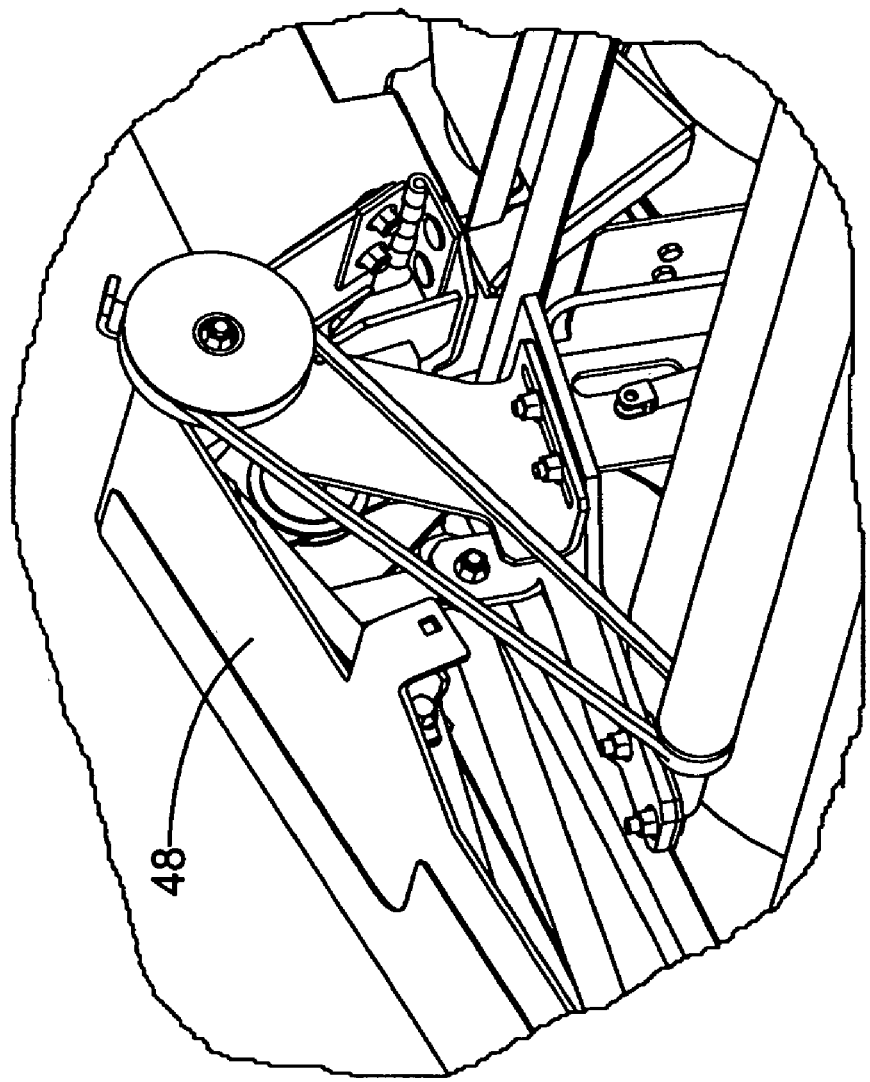
FIG. 7 is a perspective view of a wrapping material indicator.

The housing 32 is formed in part by the frame 14 and contains an essentially horizontal floor 42 and a cover 44 that can open upward. In some embodiments, the floor 42 could be inclined. The cover 44 can be pivoted vertically about a hinge 46 from a closed position (FIG. 2), into an open position (FIG. 3). A recess 48 (FIG. 7) is provided on the cover 44 located on the right as seen in the direction of operation. A retainer 50 is also provided on the inside of the rear upper region of the cover.

The wrapping material roll 34 stores a large length of wrapping material 28. When the wrapping material 28 is withdrawn from the wrapping material roll 34 (located on the left in FIGS. 2 and 3), it is brought into contact with the wrapping material supply arrangement 36, and is tensioned and retained by means of a counter roll 52. As shown in the drawing, a second wrapping material roll 34 may be provided as an additional supply. The counter roll 52 is retained, while free to pivot vertically, by arms 54 which engage at one end with the end of the counter roll 52 and at their other end engage a bearing 56 of the frame 14. The counter roll 52 is brought into contact with, or lifted away from, the wrapping material roll 34 by means of an actuation assembly 100. While the actuation assembly 100 is configured as described below, it could also comprise a rope, chain, linkage, or similar mechanism, where an upward pivoting movement of the cover 44 lifts the counter roll 52 off the wrapping material roll 34. However, some embodiments may omit the counter roll 52, relying only on inertia, friction or another means to tension the wrapping material 26.

The actuation assembly 100 includes a first retainer 102, a pivoting part 104, a second retainer 106, a steering arm 108, an actuation arrangement 110 and a retainer 112. These components are usually provided on both the left and right sides of the wrapping arrangement 12, but it is also possible to provide them on only a single side. The actuation assembly 100 is required to force the cover 44 into a closed position or, after overcoming a dead center position, to open the cover 44 and retain it there. It also forces the counter roll 52 into contact with the wrapping material roll 34 when the cover 44 is closed.

The first retainer 102 extends in an upright direction and is rigidly connected to the frame 14. It supports a bearing 114 in an upper end region that is located approximately at half the height of the space underneath the cover 44. The pivoting part 104 is generally configured as a triangular plate, each of whose corners are provided with a bearing 116, 118, 120. The pivoting part 104 may have a different shape, so long as the three bearings 116, 118, 120 do not lie along a straight line. The pivoting part 104 is connected to the retainer 102, free to pivot, by means of the bearing 118.

The second retainer 106 is rigidly attached to the upper side of the arm 54, near the pivoting part 104, and a bearing 122 in a flat portion. The steering arm 108 is a bracket or a plate that extends between the bearing 116 on the pivoting part 104 and the bearing 122 in the second retainer 106. The steering arm 108 is connected, free to pivot, to the pivoting part 104 as well as to the retainer 106. The length of the steering arm 108 is selected such that, even when the wrapping material roll 34 occupies its largest diameter, the counter roll 52 rests upon the wrapping material roll 34 and can be accommodated within the space under the cover 44 when it is closed.

The actuation arrangement 110 is usually a gas spring, but may be another device, such as a mechanical spring, that is retained, free to pivot, at its one end in the bearing 120 and at its other end in the bearing 124 in the retainer 112. It assumes its shortest length when the cover 44 is closed. The retainer 112 is located at the underside of the cover 44 generally opposite the hinge 46.

The wrapping material supply arrangement 36 contains a driven roll 58 that can be driven hydraulically, electrically or mechanically. In the current embodiment, a baling element 26 mechanically drives the driven roll 58 only when the wrapping material 28 needs to be introduced into the baling chamber 24.

Located opposite the roll 58 and parallel to it is a contact force arrangement 60 provided with a pivoting assembly 62, a second roll 64, an energy accumulator 66 and a connection 68. The contact force assembly 60 is required to force the wrapping material 28 against the driven roll 58 by means of the second roll 64, so that the wrapping material 28 can be safely pulled off the wrapping material roll 34. The contact force assembly 62 is configured in such a way that the second roll 64 can be raised from contact with the driven roll 58 in order to form a slot between the two through which the wrapping material 28 can be initially introduced. The pivoting assembly 62 includes steering arms 70 that engage, at one end, a bearing 72 on the frame 14, free to pivot vertically, and engage the second roll 64, free to rotate, with the other end. The steering arms 70 are equipped with at least one deflector 74 at their end region facing the second roll 64. These prevent wrapping material 28 from wrapping around the second roll 64. In some embodiments, the deflector 74 may be omitted. The second roll 64 can be made of various materials, such as metal or plastic, and may be smooth or profiled. In place of a single roll, several wheels or disks, either in contact with each other or spaced away from each other, could be fastened to a shaft and rotate in unison. Further, if the deflector 74 is configured in the form of a rake, its individual tines could then penetrate into the free spaces of the body of revolution formed as described. In a preferred embodiment, the second roll 64 is not driven.

In addition the energy accumulator 66 is typically configured as a gas spring where the gas is under pressure and tends to expand. Other energy accumulators may also be used, for example those operating on the basis of stored mechanical energy (i.e. springs). The energy accumulator 66 engages the frame 14 with its upper end and engages the steering arm 70 with its other end, thereby forcing the second roll 64 against the driven roll 58.

The connection 68 is configured as a steel cable, although other devices could be used, such as a chain, rope, or similar linkage. The connection 68 is connected at one end to the retainer 50 on the inner side of the cover 44, and at its other end to the pivoting assembly 62, for example, in the region of the deflector 74. The length and the connecting joints of the connection 68 is selected so that the second roll 64 can be in contact with the driven roll 58 when the cover 44 is closed, and lifted away from it when the cover 44 is opened. Using friction, the driven roll 58 transmits the energy of its movement to the wrapping material 28 captured between the driven roll 58 and the second roll 64 and pulls it off the wrapping material roll 34. The contact force assembly 60 can be applied independently of the wrapping material separating arrangement 38 and the wrapping material indicator arrangement 40.

Figure 5:
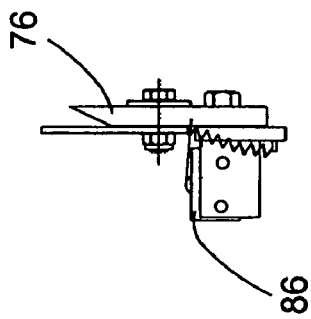
FIG. 5 illustrates a side view of the wrapping material separating arrangement seen in FIG. 4.
Figure 4:
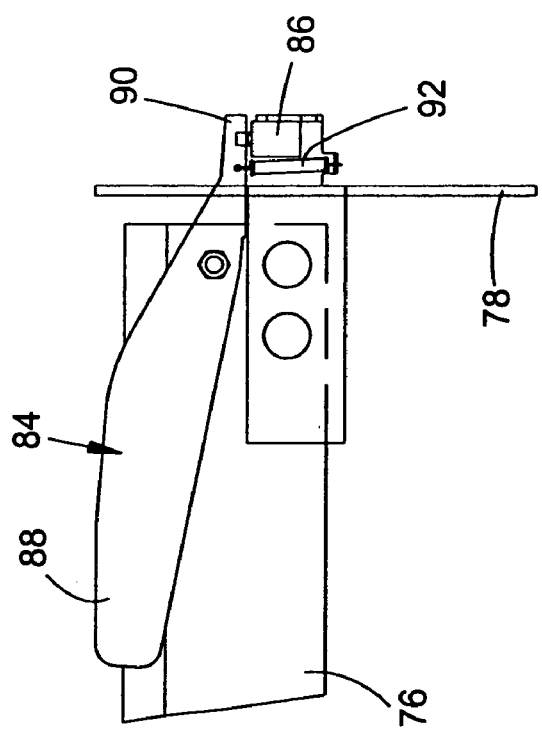
FIG. 4 is a front view of a wrapping material separating arrangement in a non-operating position.
Figure 6:
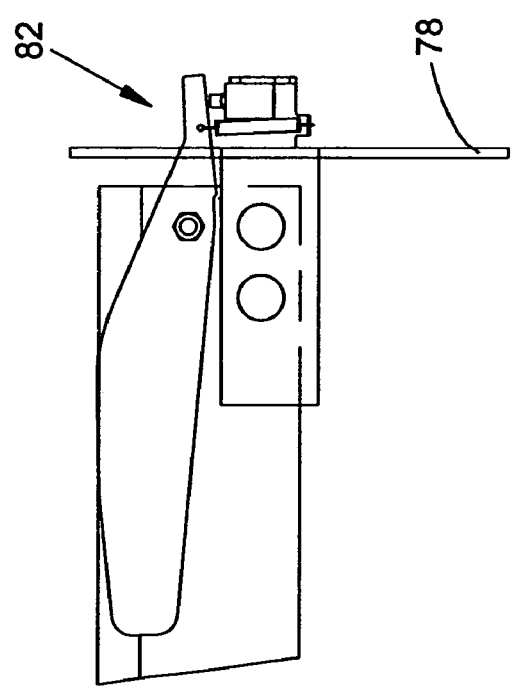
FIG. 6 shows the wrapping material separating arrangement seen in FIG. 4 in an operating position.

The wrapping material separating arrangement 38 (see FIGS. 4 through 6) includes a separating element 76 attached to a pivoting lever 78 that can be pivoted about the axis of rotation of the driven roll 58 by means of an actuation arrangement (not shown) between a non-operating position and an operating or separating position. The separating element 76 interacts with a stop 80 that is rigidly attached to the frame 14. When the separating element 76 is in contact with stop 80, it clamps the wrapping material 28 along a line and the tension built up in the wrapping material 28 causes it to separate.

In order for the wrapping material separating arrangement 38 to recognize, on the one hand, whether any wrapping material 28 is actually present and being conveyed to the baling chamber 24, and on the other hand, whether the wrapping material 28 has actually been separated, a sensor 82 is provided. The sensor 82 is equipped with a switching device 84 coupled to a switch 86. The switching device 84 consists of a profiled flat strip attached to the separating element 76 such that the switching device 84 projects across a leading edge of the separating element 76 in a first end position and, in a second end position, remains behind this edge. The switching device 84 includes a two-armed lever with a large leg 88 that can contact the wrapping material 28, and a small leg 90 that can press the switch 86. A small spring 92 is inserted between the small leg 90 of the switching device 84 and the pivoting lever 78. The spring ensures that, in the unloaded condition, the switching device 84 projects across the leading edge of the separating element 76 at all times, causing it to assume an end position. The switch 86 is a simple electric on-off switch that is turned off and turned on as a function of the position of the switching device 84. The small leg 90 as well as the switch 86 are located on the pivoting lever 78, on the side opposite the separating element 76. In the drawing, the positions of the separating element 76 and the switching device 84 correspond to each other in FIGS. 2, 4 and 5, since the switching device 84 projects across the leading edge of the separating element 76.

As soon as the end region of the wrapping material 28, shown in FIG. 2, reaches the baling chamber 24 and is grasped by the cylindrical bale 30, the wrapping material 28 will stretch and force the switching device 84 behind the aforementioned edge into a second end position. This switching process generates a signal from the sensor 82 from which it can be recognized that wrapping material 28 is present. If the wrapping material 28 is forced against the stop 80 by the contact of the separating element 76, the switching device 84 is again moved ahead of the aforementioned edge on the basis of the force of the spring 92, whereby the switch 86 is turned off and generates another signal that can be displayed on the towing vehicle or that triggers a particular operating condition, such as further baling. Usually, a sensor 82 is provided only on one side of the separating element 76, although several sensors could also be used. In addition, the switching device 84 is located close to the separating element 76 so that it is not affected by a misshapen course of the wrapping material.

Finally, a wrapping material indicator arrangement 40 is also disclosed by FIGS. 1-3, and 7 and is used to indicate that wrapping material 28 is being withdrawn from the wrapping material roll 34 during a wrapping process, and to show how much wrapping material remains on the wrapping material roll 34. For this purpose the wrapping material indicator arrangement 40 includes a carrier 94, a wheel 96 and a tensioning device 98. The carrier 94 is configured as a bar that is rigidly connected to the arm 54 located on the right in the forward operating direction and extending at an angle of approximately 90° to the arm 54. The wheel 96 is retained, free to rotate, on the carrier 94, and is provided with colored markings and may also be connected by a flexible shaft to an indicator arrangement, or an electrical circuit including an electronic indicator. The wheel 96 and the carrier 94 are dimensioned in such a way that the wheel 96 projects through the recess 48 and is visible from the outside when the cover 44 is lowered. The tensioning device 98 connects the counter roll 52 with the wheel 96, so that both stop together and rotate together.

As can be seen in FIG. 2, the position of the arm 54 is a function of the diameter of the wrapping material roll since the counter roll 52 rests on the circumferential surface of the wrapping material roll and follows its radial dimension. The formula $V=2\pi \times n \times r$ indicates that the circumferential velocity of the wrapping material roll 34 remains constant as the diameter decreases. This is because the required amount of wrapping material 28 remains constant, thereby increasing the rotational speed as the amount of material remaining decreases. Accordingly the wheel 96 will rotate at a constant speed. Thus, a change in speed of the wheel 96 indicates a malfunction, for example wrapping material 28 wrapping around a bailing element 26 and not being conducted into the baling chamber 24. In addition, since the wheel 96 is located in a rear arched region of the cover 44 at the maximum diameter of the wrapping material roll 34, it will pivot forward and extend into the recess 48 as the diameter of the wrapping material roll 34 decreases. As can be seen in FIG. 3, the position of the wrapping material indicator arrangement 40 is independent of the position of the cover 44. However, in some embodiments a connection between the arms 54 and the cover 44 could be established, similar to the connection 68, so that the counter roll 52 is raised from the wrapping material roll 34 at all times when the cover 44 is raised.

As a person skilled in the art will readily appreciate, the above description is meant as an illustration implementing the principles of this invention. This description is not intended to limit the scope or application of this invention in that the invention is susceptible to modification, variation and change, without departing from spirit of this invention, as defined in the following claims.

We claim:

1. A wrapping material indicator arrangement of a wrapping machine comprising a device supported on the circumference of a wrapping material roll from which wrapping material is withdrawn during a wrapping operation wherein the wrapping material roll rotates during the wrapping operation, a housing comprising a cover that encloses said device and wrapping material roll and having a stationary recess, the device connected to an indicator which is moveable in position with respect to the machine as a diameter of the wrapping material roll decreases, said device comprising at least one arm having a first end and a second end, the first end supported in a stationary bearing, free to pivot, and second end supported on or against the wrapping material roll, where said indicator comprises a bar mounted on the arm and carrying a rotating wheel, the periphery of which wheel projects through said stationary recess and which bar provides a spatial reference point with respect to said recess and the position of the arm corresponds to the amount of wrapping material on the wrapping material roll.

2. The wrapping material indicator arrangement of claim 1, wherein the device includes a mounted on said bar that is brought into rotation by rotation of the wrapping material roll.

3. The wrapping material indicator arrangement of claim 2, wherein the wheel is coupled to the indicator.

4. The wrapping material indicator arrangement of claim 2, wherein the wheel is provided with colored markings.

5. The wrapping material indicator arrangement of claim 2, wherein a rotational speed of the wheel is compared with a target rotational speed.

6. The wrapping material indicator arrangement of claim 2, wherein the wrapping material roll is retained by a counter roll mounted on the second end of said arm in rotating contact with the wrapping material roll.

7. The wrapping material indicator arrangement of claim 6, wherein the counter roll is connected to the wheel by means of a tensioning device that brings the wheel into rotation.

8. The wrapping material indicator arrangement of claim 1, comprising an actuation arrangement that forces the arm against the wrapping material roll.

9. The wrapping material indicator arrangement of claim 1, comprising an actuation assembly having a steering arm, the actuation assembly being supported on a frame of the wrapping machine, and the steering arm transferring forces from the actuation assembly to the cover.

* * * * *